United States Patent [19]

Forsgren

[11] Patent Number: 5,096,340
[45] Date of Patent: Mar. 17, 1992

[54] ADJUSTABLE DEPTH GAGE

[75] Inventor: Roger C. Forsgren, Westlake, Ohio

[73] Assignee: The United States of America as represented by the Administrator of the National Aeronautics and Space Administration, Washington, D.C.

[21] Appl. No.: 376,738

[22] Filed: Jul. 7, 1989

[51] Int. Cl.⁵ .............................................. B23B 39/00
[52] U.S. Cl. ........................................ 408/14; 408/16; 408/241 S
[58] Field of Search ............... 408/241 S, 14, 16, 111, 408/112, 110; 409/218; 29/65; 82/153–155

[56] References Cited

U.S. PATENT DOCUMENTS

| | | | |
|---|---|---|---|
| 1,063,665 | 6/1913 | Dreses et al. | 408/14 |
| 1,305,872 | 6/1919 | Bollie | 408/234 |
| 1,369,313 | 2/1921 | Zega | 408/64 |
| 1,945,045 | 1/1934 | Johnson | 408/16 X |
| 2,077,109 | 4/1937 | Jasmin | 82/153 X |
| 2,110,537 | 3/1938 | Tautz | 408/16 |
| 2,463,860 | 3/1949 | Foster | 143/157 |
| 2,574,653 | 11/1951 | Miller | 408/241 S X |
| 2,664,768 | 1/1954 | Clyne | 77/34.5 |
| 2,973,673 | 3/1961 | Grau | 77/7 |
| 3,550,481 | 12/1970 | Jensen | 408/112 |
| 3,958,893 | 5/1976 | Boyajian | 408/112 |
| 4,014,621 | 3/1977 | Johnson et al. | 409/218 X |
| 4,693,656 | 9/1987 | Guthrie | 409/241 S X |

FOREIGN PATENT DOCUMENTS 1383228 2/1975 United Kingdom ................. 408/14

OTHER PUBLICATIONS

Drilling Technology, pp. 2 and 89, 1977.

*Primary Examiner*—Larry I. Schwartz
*Assistant Examiner*—Robert Schultz
*Attorney, Agent, or Firm*—Gene E. Shook; Harold W. Adams; James A. Mackin

[57] ABSTRACT

A quick adjust depth gage includes a handle-clamp assembly wherein the clamp includes an opening in which a cylindrical shaft with suitable depth measurement markings thereon is received. Turning the handle on the clamp enables the gage to be set to the desired depth.

1 Claim, 3 Drawing Sheets

ADJUSTABLE DEPTH GAGE

ORIGIN OF THE INVENTION

The invention described herein was made by an employee of the United States Government and may be manufactured and used by or for the Government for governmental purposes without the payment of any royalties thereon or therefor.

TECHNICAL FIELD

This invention is concerned with an improved depth gage for a machine tool such as a drill press, milling machine or the like. This invention is particularly concerned with making the adjustment of such a depth gage quicker and less cumbersome.

A typical depth gage of the prior art comprises a threaded rod milled flat on two sides. The machine operator is required to rotate two knurled knobs up or down the length of the threaded rod.

An apparent disadvantage of such prior art devices is that the adjustment is time consuming and cumbersome. Also the manufacturing of these prior art devices can be quite complicated.

It is, therefore, an object of the present invention to make adjusting the limit of travel of a rotating cutting apparatus into a workpiece faster and easier.

A further object of the invention is to provide an improved depth gage which is simple to manufacture.

BACKGROUND ART

U.S. Pat. No. 2,463,860 to Foster shows a handle-clamp device that is used with a portable chainsaw.

U.S. Pat. No. 2,973,673 to Grau discloses a portable drill attachment used in converting a portable hand drill to a drill press. A handle-clamp assembly is provided to adjust the height of a drill above the work piece.

U.S. Pat. No. 2,664,768 to Clyne describes a motion limiting device that is used to quickly and easily adjust the depth on a drill press. The device includes a knurled knob on a threaded rod. Adjustment is accomplished by depressing a spring and moving the knob manually to the desired position.

DISCLOSURE OF THE INVENTION

A quick adjust depth gage utilizes a handle-clamp assembly which includes a movable stop having a bore extending vertically through it. A cylindrical member with suitable depth measurement indices thereon is slideably mounted in the bore.

Turning of a handle on the clamp enables the gage to be set to a desired depth. The cylindrical member is then locked into place relative to the movable stop by tightening the clamp with the handle.

DESCRIPTION OF THE DRAWING

The details of the invention will be described with the accompanying drawings in which.

BEST MODE FOR CARRYING OUT THE INVENTION

Figure 1:
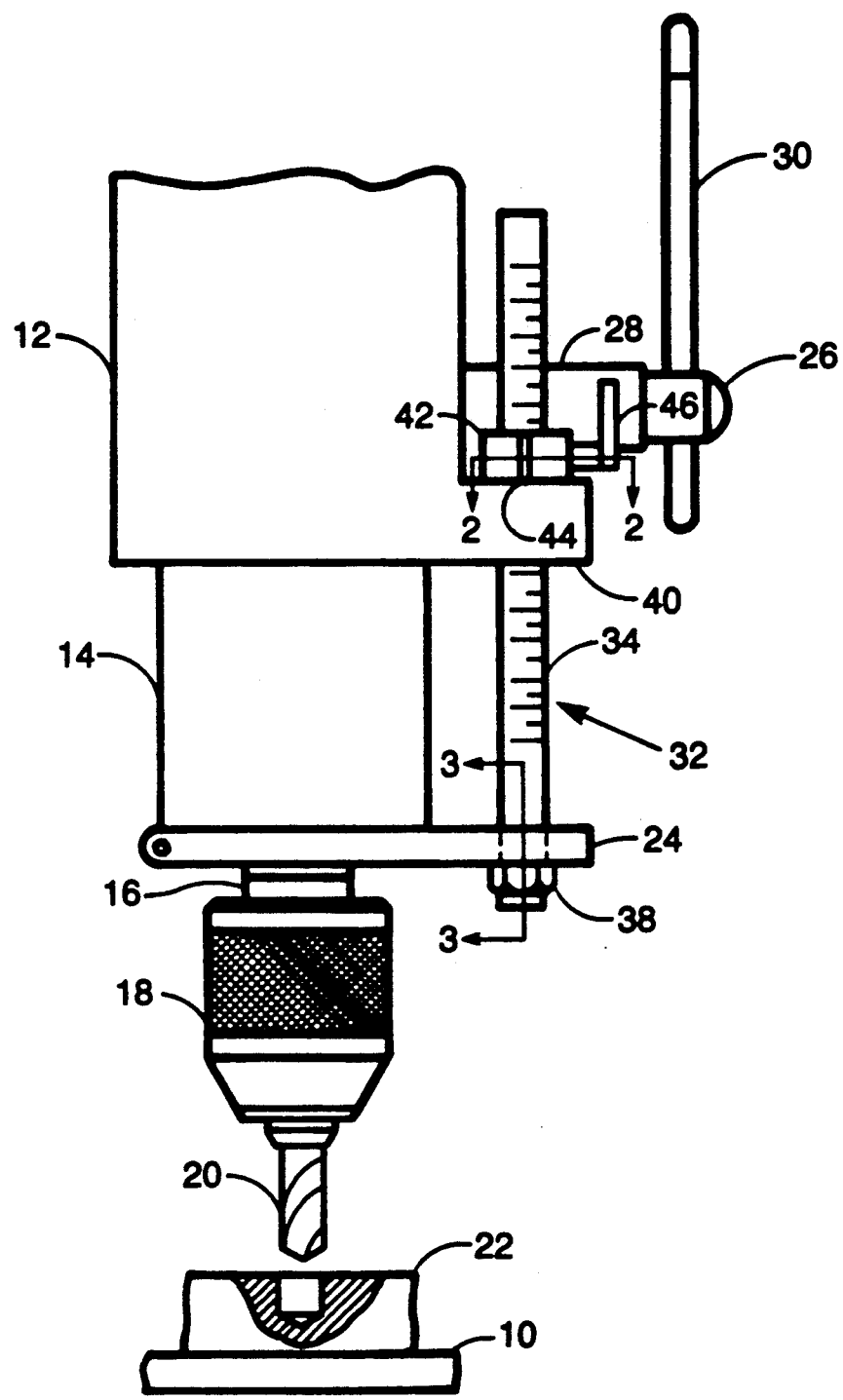
FIG. 1 is a front elevation showing the essential parts of a drill press having an improved depth gage mounted thereon.

Referring now to the drawing, there is shown in FIG. 1 a front view of a portion of a machine tool, such as a drill press, having a table 10, a head 12, and a quill 14 that is mounted for reciprocable motion within the head. A drill shaft 16 is mounted for rotation about a vertical axis within the quill, and a chuck 18 is secured to the lower end of the drill shaft. A drill bit 20 is changeably mounted in the chuck in a manner well known in the art, and the bit rotates about the same vertical axis.

A workpiece 22 supported by the table 10 is positioned beneath the drill bit 20. The table 10 remains stationary as the rotating bit 20 enters the workpiece 22. A bracket 24 is secured to the vertically movable quill 14. The adjustable depth gage of the present invention is mounted on the bracket 24 in a manner that will be described later in greater detail.

Means are provided for moving the quill 14 and the drill shaft 16 vertically within the head 12 in a straight line. More particularly, a horizontally extending shaft 26 is rotatably mounted within a sleeve 28 that extends laterally from the head 12. A bar handle 30 is mounted on the outermost end of the shaft 26. This shaft is provided with teeth which are in operable engagement with mating teeth on the quill 14 in a manner well known in the art. As the operator turns the shaft 26 with the handle 30 the quill 14 will move up or down. This motion, in turn, carries the drill bit 20 into cutting engagement with the workpiece 22.

Figure 2:
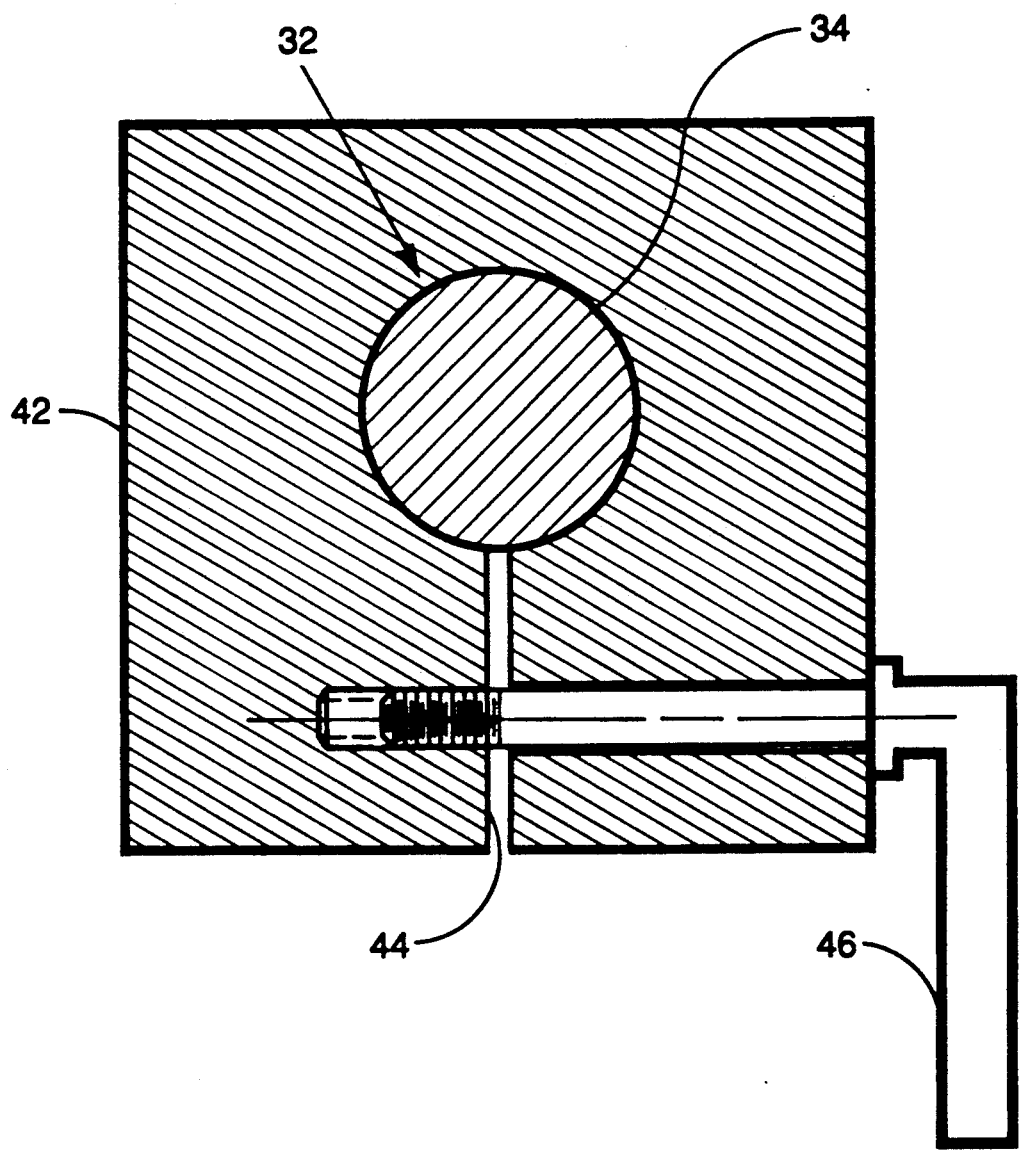
FIG. 2 is an enlarged section view taken along the line 2—2 in FIG. 1 showing the detailed of a movable stop.
Figure 3:
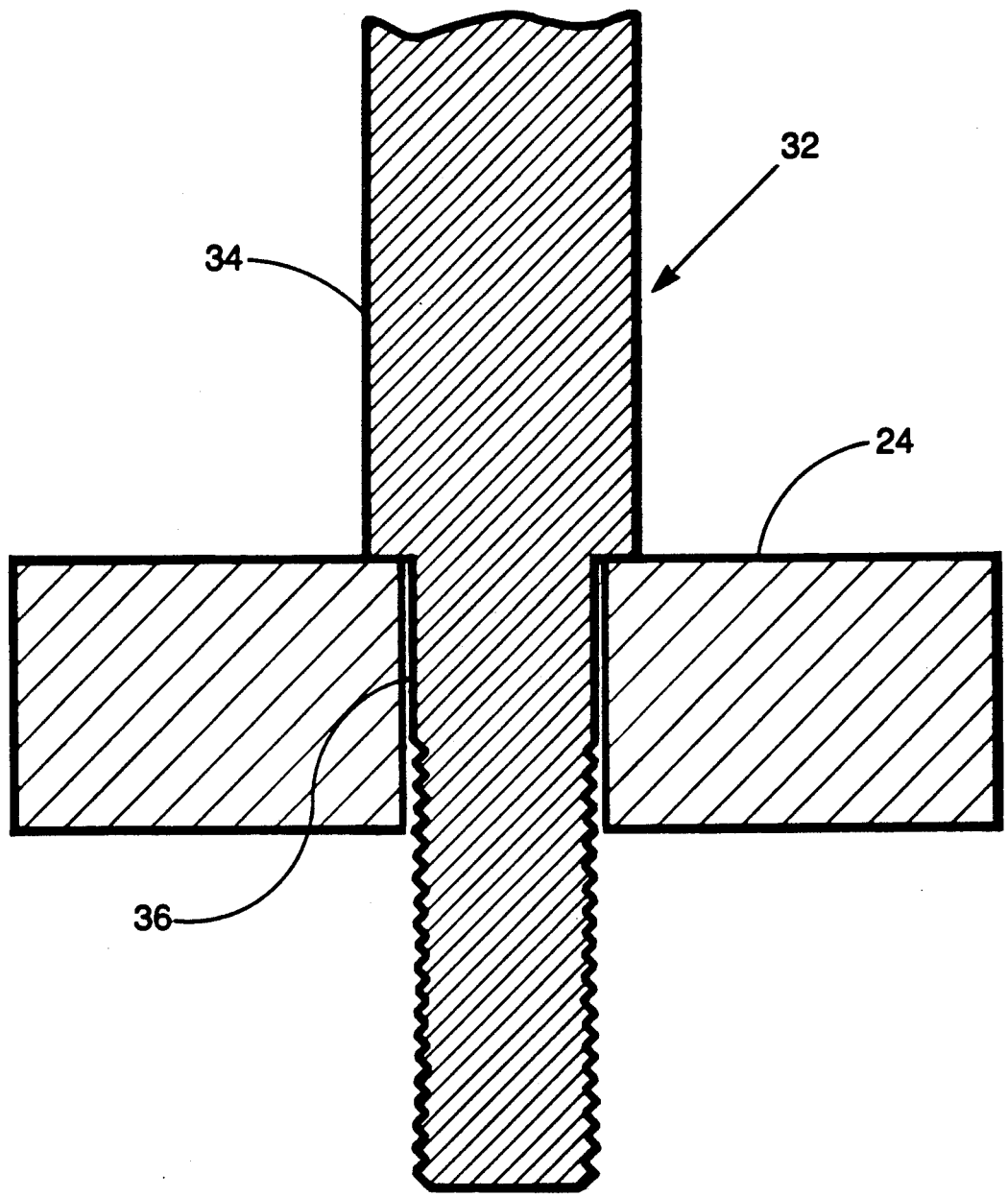
FIG. 3 is an enlarged section view taken along the line 3—3 in FIG. 1 showing the mounting of the depth gage.

An improved quick adjust depth gage constructed in accordance with the present invention is mounted on the bracket 24 for movement with the quill 14 along an axis parallel to the axis of vertical movement of the quill. Referring to FIGS. 1, 2, and 3, the gage comprises an elongated cylindrical member 32 in the form of a rod which extends vertically from the bracket 24. As shown in FIG. 1, the rod 32 includes an upper portion 34 having measuring indices thereon which may be either in English or metric units.

Referring to FIG. 3 a threaded neck portion 36 having a reduced diameter extends from the lower end of the rod 32 and is received in a suitable hole in the bracket 24. A nut 38 mounted on the neck 36 ridgedly secures the rod 34 to the bracket 24 as shown in FIG. 1.

The rod passes through a lug 40 which extends outwardly from the head 12. The rod 34 passes freely through this lug.

A movable stop 42 also slides freely along the upper portion 34 of the rod 32. A slot 44 passes through the stop 42 to a centrally disposed bore which receives the upper portion 34 of the rod 32.

A threaded handle passes through a portion of the stop 42 through the slot 44 into a threaded portion. It is apparent that turning of the handle 46 causes the stop to deform along the slot 44 and firmly engage the rod 32.

In operation, the drill bit 20 is lowered into engagement with a workpiece 22 by rotating the handle 30. This causes the rod 32 to move with the quill 14 through the lug 40 and stop 44. After the drill bit 20 engages the workpiece 22, the stop 42 is easily moved upward along the rod 32 a suitable distance determined by the measuring indices. The stop 42 is then quickly clamped onto the rod 32 by turning the handle 46. The drill bit 20 is raised out of engagement with t he workpiece 22 and the drill is started. Downward movement of the handle 30 by the operator moves the drill into the workpiece 22 until further movement is prevented by the engagement of the stop 42 with the lug 40.

While preferred embodiment of the invention has been disclosed and described, it will be apparent that various modifications can be made to the structure without departing from the spirit of the invention or the scope of the subjoining claims. By way of example, it is contemplated that this adjustable depth gage can be mounted on a milling machine instead of a drill press.

I claim:

1. In a drill press having a head with a lug extending therefrom with a cylindrical passage therein, said head mounting a reciprocating quill of the type having a bracket secured thereto for movement therewith while said quill carries a drill bit which rotates about an axis for selective reciprocating movement in a forward direction toward a workpiece and a reverse direction away from said workpiece relative to said head along said axis, an adjustable gage comprising a cylindrical rod having a substantially smooth outer surface and a normal axis substantially parallel to the axis of rotation of said drill bit with a portion of said outer surface slidably engaging the passage in the lug, threaded means for detachably mounting said rod on said bracket whereby said rod moves with said quill freely through said passage in said lug, measuring indices on said portion of said outer surface of said rod adjacent to said passage in said lug, a slotted deformable stop having a bore extending therethrough for receiving said portion of said rod whereby said stop is slidably mounted at a selected position on said rod remote from said bracket as determined by said measuring indices, said stop having a slot extending from an outer surface thereof to said bore thereby forming a pair of adjacent portions separated by said slot, one of said portions having threads therein adjacent to said slot and the other portion having a passage therein aligned with said threads, and a single threaded handle extending through said passage into said threads so that turning of said handle in one direction causes said stop to deform thereby clamping the same in engagement with said rod at said selected position whereby said stop engages said lug to positively limit said reciprocating movement in said forward direction and turning said handle in a direction opposite said one direction causes said stop to disengage said rod so that said stop is free to slide along said rod to another selected position.

* * * * *